(12) United States Patent
Oki et al.

(10) Patent No.: US 6,465,389 B1
(45) Date of Patent: Oct. 15, 2002

(54) HEAT RESISTANT CATALYST SHEET AND PROCESS FOR PRODUCING SAME

(75) Inventors: Yasuyuki Oki; Hironobu Koike; Yoshiaki Takeuchi, all of Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/627,056

(22) Filed: Jul. 27, 2000

(30) Foreign Application Priority Data

Jul. 29, 1999 (JP) .......................................... 11-215236

(51) Int. Cl.$^7$ .......................... B01J 31/00; B01J 23/00; D02G 3/00; D21F 11/00; C08G 63/00

(52) U.S. Cl. ...................... 502/159; 502/309; 502/350; 502/527.24; 428/221; 428/372; 428/373; 428/365; 428/364; 428/357; 162/141; 162/146; 162/157.3; 528/184

(58) Field of Search .................... 502/159, 309, 502/312, 350, 527.24; 428/221, 372, 373, 365, 364, 357; 162/141, 146, 157.3; 528/184

(56) References Cited

U.S. PATENT DOCUMENTS

| | | | |
|---|---|---|---|
| 3,166,895 A | | 1/1965 | Slayter et al. .................. 60/29 |
| 3,920,428 A | | 11/1975 | Kinsley, Jr. ................... 55/528 |
| 4,177,168 A | | 12/1979 | Denny et al. ................ 252/470 |
| 4,515,656 A | * | 5/1985 | Memeger, Jr. .............. 162/101 |
| 4,529,644 A | | 7/1985 | Awano et al. ................ 428/284 |
| 4,888,091 A | * | 12/1989 | Nollen et al. ................ 162/109 |
| 5,188,896 A | * | 2/1993 | Suh et al. ..................... 428/397 |
| 5,433,998 A | * | 7/1995 | Curzio et al. ................ 428/260 |
| 5,738,940 A | * | 4/1998 | Neuert ........................ 428/372 |
| 6,086,844 A | * | 7/2000 | Koike et al. ................. 423/598 |
| 6,159,895 A | * | 12/2000 | Koch et al. .................. 502/324 |
| 6,162,538 A | * | 12/2000 | LaNieve et al. ............. 428/373 |
| 6,162,759 A | * | 12/2000 | Oki et al. .................... 502/350 |
| 6,191,067 B1 | * | 2/2001 | Koike et al. ................. 502/350 |
| 6,207,276 B1 | * | 3/2001 | Spindler et al. ............. 428/373 |
| 6,235,388 B1 | * | 5/2001 | Yamamoto et al. ......... 428/364 |

FOREIGN PATENT DOCUMENTS

| | | |
|---|---|---|
| EP | 0 336 882 A1 | 10/1989 |
| EP | 0 398 765 A1 | 11/1990 |
| JP | A055294 | 1/1993 |
| JP | A5186615 | 7/1993 |
| JP | A6316467 | 11/1994 |
| JP | B722709 | 3/1995 |
| JP | B2538509 | 7/1996 |
| JP | B2562077 | 9/1996 |
| JP | 10-325021 | 12/1998 |
| JP | 11-5036 | 1/1999 |
| WO | WO97/32118 | 9/1997 |
| WO | WO99/36605 | 7/1999 |

* cited by examiner

Primary Examiner—Mark L. Bell
Assistant Examiner—Patricia L. Hailey
(74) Attorney, Agent, or Firm—Birch, Stewart, Kolasch & Birch, LLP

(57) ABSTRACT

There are provided (i) a heat resistant catalyst sheet having an aramid fiber and a catalyst component-containing titania fiber; and (ii) a process for producing a heat resistant catalyst sheet, which has the step of making paper from a mixture of an aramid fiber and a catalyst component-containing titania fiber.

15 Claims, No Drawings

HEAT RESISTANT CATALYST SHEET AND PROCESS FOR PRODUCING SAME

FIELD OF THE INVENTION

The present invention relates to a heat resistant catalyst sheet, and a process for producing same. More specifically, the present invention relates to a heat resistant catalyst sheet, whose catalytic activity can be retained for a long period of time, because a catalyst component contained therein hardly leaves from the catalyst sheet, and which is superior in its heat resistance and its processability, and relates to a process for producing said heat resistant catalyst sheet. The heat resistant catalyst sheet in accordance with the present invention can be used preferably for, for example, reduction of nitrogen oxides, oxidation of organic substances such as organic solvents, agricultural chemicals and surfactants, and decomposition of dioxin.

BACKGROUND OF THE INVENTION

As a heat resistant catalyst sheet, JP-B 7-22709 discloses a nitrogen oxide removal catalyst sheet. Said catalyst sheet is obtained by supporting vanadium oxide on solid-carrying paper, which is obtained by impregnating ceramics paper with a mixture of titania sol and silica sol, followed by drying and calcining, wherein said ceramics paper is made from a silica-alumina based ceramics fiber, or an alumina based ceramics fiber.

Further, as another heat resistant catalyst sheets, Japanese Patent No. 2562077 discloses a nitrogen oxide removal catalyst sheet. Said catalyst sheet is obtained by adsorbing and supporting vanadium oxide on solid-carrying paper, which is obtained by impregnating ceramics paper with $TiO_2$ sol, followed by drying and calcining, and further impregnating the resulting paper with $SiO_2$ sol, followed by drying, wherein said ceramics paper is made from a ceramics fiber containing $SiO_2$ sol.

Each of the references referred to above is incorporated herein by reference in its entirety.

However, each of the catalyst sheets disclosed in the above-mentioned publications has problems such that (i) a catalyst component contained therein easily leaves from the catalyst sheet, (ii) its processability is not excellent, and (iii) it does not exhibit enough catalyst performance.

SUMMARY OF THE INVENTION

Accordingly, an object of the present invention is to provide a catalyst sheet, whose catalytic activity can be retained for a long period of time, because a catalyst component contained therein hardly leaves from the catalyst sheet, and which is superior in its heat resistance and its processability, and a process for producing said catalyst sheet.

The present inventors have undertaken extensive studies to develop a heat resistant catalyst sheet. As a result, it has been found that a catalyst sheet obtained by combining an aramid fiber and a catalyst component-containing titania fiber can accomplish the object of the present invention, and thereby the present invention has been obtained.

The present invention provides a heat resistant catalyst sheet comprising an aramid fiber and a catalyst component-containing titania fiber.

Further, the present invention provides a process for producing a heat resistant catalyst sheet, which comprises the step of making paper from a mixture of an aramid fiber and a catalyst component-containing titania fiber.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAIL DESCRIPTION OF THE INVENTION

A catalyst component-containing titania fiber used in the present invention is not particularly limited. As examples of the catalyst component-containing titania fiber, those disclosed in JP-A 11-5036 and Japanese Patent Application No. 10-333786 are enumerated. Each of the references referred to above is incorporated herein by reference in its entirety. Here, the term, "titania fiber", means a fiber containing a $TiO_2$ component.

Specific examples of the catalyst component-containing titania fiber used in the present invention are those satisfying the following conditions (1) to (7):

(1) titanium oxide is contained in an amount of not less than about 50% by weight, provided that the weight of the catalyst component-containing titania fiber is assigned to be 100% by weight, (2) a fiber length is not less than about 50 μm, which length is not an average fiber length, but a length of respective fibers, (3) a fiber diameter is within a range of from about 2 to about 100 μm, (4) a specific surface area measured by a BET method is not less than about 10 $m^2/g$, and preferably from about 20 to about 300 $m^2/g$, (5) a pore volume measured by a nitrogen adsorption method is not less than about 0.05 cc/g, (6) a pore volume having a pore radius of not less than 10 Å is not less than about 0.02 cc/g, and (7) a pore radius peak is from about 10 to about 300 Å, and preferably from about.10 to about 100 Å.

A catalyst component used in the present invention is not particularly limited, and may be appropriately determined depending on uses of the catalyst sheet. Examples of the catalyst component usually used are at least one metal selected from the group consisting of V, W, Al, As, Ni, Zr, Mo, Ru, Mg, Ca, Fe, Cr and Pt, at least one metal oxide selected from the group consisting of oxides of said metals, and at least one composite oxide selected from the group consisting of composite oxides of said metals.

When the catalyst sheet in accordance with the present invention is used for reducing nitrogen oxides, it is recommendable to use, as the catalyst component, at least one preferred metal selected from the group consisting of V, W and Mo, or at least one metal oxide selected from the group consisting of oxides of said preferred metals, or at least one composite oxide selected from the group consisting of composite oxides of said preferred metals.

An amount of the catalyst component contained in the catalyst sheet is not particularly limited, and may be determined depending on uses of the catalyst sheet. The amount of the catalyst component is usually from about 0.001 to about 50% by weight in terms of metal oxide, provided that said metal contained in the catalyst sheet is converted into its metal oxide, and the weight of the catalyst component-containing titania fiber is assigned to be 100% by weight.

A process for producing the catalyst component-containing titania fiber is not particularly limited. As examples of the production process thereof, those comprising steps mentioned in the following Process-1 and Process-2 are enumerated. It is necessary to carry out respective steps of from Step-1 to Step-4, through which a precursor fiber is obtained, under atmosphere of an inert gas such as nitrogen gas. However, the obtained fiber precursor can be handled in the air.

Process-1
  Step-1 of dissolving a titanium alkoxide in an alcohol such as isopropyl alcohol to obtain a solution,
  Step-2 of hydrolyzing the obtained solution to obtain a slurry,
  Step-3 of dissolving a vanadium compound in the slurry to obtain a spinning solution,
  Step-4 of spinning the spinning solution to obtain a precursor fiber, and
  Step-5 of calcining the precursor fiber to obtain a titania fiber.

Process-2
  Step-1 of dissolving a titanium alkoxide and a vanadium compound in an alcohol such as isopropyl alcohol,
  Step-2 of hydrolyzing the obtained solution to obtaining a slurry,
  Step-3 of adding a solvent to the slurry, followed by mixing, and then further adding a silica compound thereto to obtain a spinning solution,
  Step-4 of spinning the spinning solution to obtain a precursor fiber, and
  Step-5 of calcining the precursor fiber to obtain a titania fiber.

A unit weight of the catalyst component-containing titania fiber present in the catalyst sheet in accordance with the present invention is not particularly limited, and may be determined depending on uses of the catalyst sheet. Here, the term, "unit weight", means a weight of the catalyst component-containing titania fiber per unit area of the sheet. From a viewpoint of increasing catalyst performance and permeability of the obtained catalyst sheet, a preferred unit weight of the catalyst component-containing titania fiber is from about 5 to about 900 g/m².

The term, "aramid fiber", used in the present invention means an aromatic polyamide fiber, namely, a fiber of polyamide having both aromatic nucleuses and amide bonds in its main molecular chain. The aramid fiber is not particularly limited. Examples of the aramid fiber are a para type aramid fiber and a meta type aramid fiber. Of these, the para type aramid fiber is preferred. From a viewpoint of easy formation of a sheet from the aramid fiber using no binder, an aramid fiber comprising a fibrillated fiber is preferable. Accordingly, a fibrillated para type aramid fiber is particularly preferable. Incidentally, the aramid fiber used in the present invention may be those comprising a fibrillated aramid fiber and a non-fibrillated aramid fiber.

Examples of the para type aramid fiber are a fiber of trademark TWARON, manufactured by Nippon Aramid Co., LTD., a fiber of trademark KEVLAR, manufactured by Dupont Co., and a fiber of trademark TECHNORA, manufactured by Teijin Limited. Examples of the meta type aramid fiber are a fiber of trademark NOMEX, manufactured by Dupont Co., a fiber of trademark TEIJIN CONEX, manufactured by Teijin Limited, and a fiber of trademark APYEIL, manufactured by Unitika Ltd.

A unit weight of the aramid fiber present in the catalyst sheet in accordance with the present invention is not particularly limited, and may be determined depending on uses of the catalyst sheet. Here, the term, "unit weight", means a weight of the aramid fiber per unit area of the sheet. From a viewpoint of balance among catalyst component-retaining ability, sheet strength and permeability of the catalyst sheet obtained, a preferred unit weight of the aramid fiber is from about 5 to about 900 g/m².

A process for producing the heat resistant catalyst sheet in accordance with the present invention is not particularly limited. An example of said production process is a process comprising the step of making paper from a mixture of an aramid fiber and a catalyst component-containing titania fiber. From a viewpoint of preventing the catalyst component from eluting out of the catalyst component-containing titania fiber, a preferable production process of the catalyst sheet is a process, which comprises the step of making paper from a mixture of an aramid fiber and a catalyst component-containing titania fiber, in the presence of at least one surfactant selected from the group consisting of alkyl dimethylaminoacetate betaines represented by the following formula (I), alkylamine acetates represented by the following formula (II) and amines represented by the following formula (III):

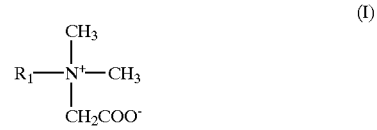

wherein $R_1$ is a $C_8$–$C_{22}$ alkyl group,

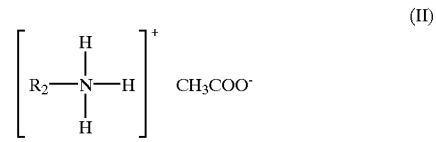

wherein $R_2$ is a $C_8$–$C_{22}$ alkyl group, and

wherein X is a hydrogen atom or a methyl group, Y is a hydrogen atom or a methyl group, and $R_3$ is a $C_8$–$C_{22}$ alkyl group.

Particularly preferred surfactants are lauryl dimethylaminoacetate betain, tridecyl dimethylaminoacetate betain and myristyl dimethylaminoacetate betain, which are represented by the formula (I); laurylamine acetate, tridecylamine acetate and myristylamine acetate, which are represented by the formula (II); and lauryl-dimethylamine, tridecyl-dimethylamine and myristyl-dimethylamine, which are represented by the formula (III).

How to make paper from a mixture of an aramid fiber and a catalyst component-containing titania fiber is not particularly limited. For example, a process comprising the following steps 1 to 3 can be given.
  Step-1 of placing water, a pulpified aramid fiber, a surfactant and a catalyst component-containing titania fiber in this order in a pulp disaggregating machine, and mixing them under stirring to obtain a uniform mixture,
  Step-2 of making wet paper from the above-mentioned uniform mixture using a paper-making machine, and Step-3 of dehydrating and drying the wet paper to obtain a catalyst sheet.

In the above Step-1, it is usually recommendable to carry out the stirring under conditions of making a length of the catalyst component-containing titania fiber not less than about 10 μm. In this step, if desired, a defoaming agent such as polyether type deforming agents, ester of fatty acid type defoaming agents and silicone type defoaming agents may be used. Additionally, in this step, an organic binding agent, which disappears during drying of Step-3 mentioned above, may be used to improve handling of the wet paper mentioned in the above Step-2, and to improve handling of the obtained catalyst sheet at a time of its transportation or installation.

In the above Step-3, conditions of dehydrating and drying are not particularly limited. Step-3 may be carried out under conventional conditions using an apparatus known in the art. Drying may be carried out two or more times, wherein temperature may be different from one another. In addition, drying may be carried out after installing the heat resistant catalyst sheet in, for example, a reaction apparatus for reducing nitrogen oxides.

The heat resistant catalyst sheet in accordance with the present invention comprises a catalyst component-containing titania fiber and an aramid fiber. Its catalytic activity can be retained for a long period of time, because a catalyst component therein hardly leaves from the catalyst sheet. The present catalyst sheet usually has a heat resistance of at least 100 hour use at 200° C., and superior processability, and is capable of retaining for a long period of time its catalytic activity for, for example, reducing nitrogen oxides, oxidizing organic substances such as organic solvents, agricultural chemicals and surfactants and decomposing dioxin. Thus, it can be said that its utility value is great from an industrial point of view.

EXAMPLE

The present invention is illustrated in more detail with reference to the following Examples, which are only illustrative, and are not limitative for the scope of the present invention.

A specific surface area and a micro pore volume of the catalyst component-containing titania fiber, and a nitorogen oxide removal efficiency of the heat resistant catalyst sheet were measured in the following manners.

1. Specific Surface Area ($m^2/g$, BET method)

A specific surface area of a pulverized product, which was obtained by mildly pulverizing a fiber with a mortar, was measured by the continuous volume method with a nitrogen gas(a. nitrogen adsorption method), by using a gas adsorption/desorption analyzer OMUNISOAP Model 360 (manufactured by COULTER Co.), wherein, prior to measuring, said analyzer was vacuumed at 130° C. for 6 hours, until a degree of vacuum in said analyzer reached $6 \times 10^{-5}$ Torr or less.

2. Pore Volume (cc/g)

A total pore volume and a micro pore volume having a pore radius of not less than 10 Å of a pulverized product, which was obtained by mildly pulverizing a fiber with a mortar, was measured by the continuous volume method with a nitrogen gas(a nitrogen adsorption method), by using a gas adsorption/desorption analyzer OMUNISOAP Model 360 (manufactured by COULTER Co.), wherein, prior to measuring, said analyzer was vacuumed at 130° C. for 6 hours, until a degree of vacuum in said analyzer reached $6 \times 10^{-5}$ Torr or less.

3. Nitrogen Oxide Removal Efficiency (%)

A nitrogen oxide removal efficiency of a circular test sheet having a diameter of 70 mm, which was obtained by punching a catalyst sheet, was measured by a method consisting of the steps of:

(1) putting the circular test sheet between two felt sheets, (2) fixing the resultant obtained between two glass-made rings having an inside diameter of 53 mm and an outside diameter of 70 mm, (3) putting the fixed material obtained above in a tubular reactor so as to make a mixed gas mentioned below to pass through the portion of the above-mentioned inner diameter 53 mm, (4) passing a mixed gas, which comprises NO (100 ppm), $NH_3$ (100 ppm) and $O_2$ (10%), and has a temperature of 200° C., through the above-mentioned tubular reactor at a flow rate of 1.27 NL/min. (linear velocity=1.0 m/min.), (5) measuring NOx concentrations at both an inlet and an outlet of the tubular reactor using an automatic $NO_x$ measuring instrument (Type ECL-77A manufactured by YANAGIMOTO MFG. CO.,LTD), and (6) calculating a nitrogen oxide removal efficiency by the following equation.

Nitrogen oxide removal efficiency(%)=(NOx concentration at inlet−NOx concentration at outlet)×100/NOx concentration at inlet

Example 1

Production of catalyst component-containing titania fiber

A solution was prepared by dissolving 300 g of titanium tetra-isopropoxide (first grade reagent), as a titanium alkoxide, manufactured by Wako Pure Chemical Industries, Ltd., 51.2 g of triethoxyvanadyl manufactured by Kojund Chemical Loboratory Co., Ltd., and 55.0 g of ethyl acetoacetate (special grade reagent), as an active hydrogen-carrying compound, manufactured by Wako Pure Chemical Industries, Ltd., in 55.4 g of isopropyl alcohol (special grade reagent), as a solvent, manufactured by Wako Pure Chemical Industries, Ltd.

The obtained solution was refluxed for 1 hour under nitrogen atmosphere. Here, the amount of triethoxyvanadyl used was controlled to be 19% by weight in terms of vanadium oxide ($V_2O_5$) present in the catalyst component-containing titania fiber obtained hereinafter, provided that the weight of the catalyst component-containing titania fiber was assigned to be 100% by weight; and a molar ratio of the amount of ethyl acetoacetate used to the amounts of titanium tetraisopropoxide used was 0.40.

A mixture of 37.9 g of water and 342 g of isopropyl alcohol was added to the above-mentioned solution under stirring, while boiling and refluxing said solution under nitrogen atmosphere, and distilling out isopropyl alcohol. Here, the distilling rate of isopropyl alcohol was controlled so as to be the same as the adding rate of the above-mentioned mixture, and the total adding time of said mixture was controlled to be 108 minutes. A water concentration in the above-mentioned mixture of water and isopropyl alcohol was 10% by weight, and the total amount of water in said mixture was 2.0 times (molar ratio) the amount of titanium tetra-isopropoxide used. Nearly when the amount of said mixture added reached that corresponding to 1.8 moles of water per mole of titanium tetra-isopropoxide, deposition of a polymer began to appear, and when the total amount of said mixture had been added, a complete slurry was obtained.

The slurry was refluxed for 1 hour, successively heated to distill out the solvent, and was concentrated up to a Ti concentration of $3.46 \times 10^{-3}$ mole/g. The amount of water distilled out of the system up to the present operation was found to be 0.07 mole per mole of titanium tetra-isopropoxide. Therefore, a difference between the amount of water added and the amount of water distilled out of the system together with the solvent or others was found to be 1.93 moles (=2.0 moles–0.07 mole) per mole of titanium tetra-isopropoxide.

To the concentrated slurry obtained, 352 g of an organic solvent, tetrahydrofuran (special grade reagent) manufactured by Wako Pure Chemical Industries, Ltd., was added, and the obtained mixture was refluxed for 1 hour to dissolve the above-mentioned polymer. To the resulting solution, 37.2 g of ethyl silicate, a trademark of ETHYL SILICATE 40, manufactured by Tama Chemicals Co., Ltd., was added, and the mixture was refluxed for 1 hour to obtain a polymer solution. Here, the amount of ethyl silicate added was 12% by weight in terms of silica ($SiO_2$) present in the catalyst component-containing titania fiber obtained hereinafter, provided that the weight of the catalyst component-containing titania fiber was assigned to be 100% by weight.

The polymer solution obtained was filtered with a TEFLON-made membrane filter having a 3 μm pore diameter, and the filtrate obtained was heated to distill out the solvent mixture of isopropyl alcohol and tetrahydrofuran, thereby obtaining 200 g of a spinning solution having a viscosity of 50 poise (40° C.).

The spinning solution kept at 40° C. was extruded in a fibrous form to an air atmosphere of temperature of 40° C. and relative humidity of 60% through a nozzle having an aperture of 50 μm with the aid of a nitrogen gas of 20 Kg/cm$^2$ pressure, and the fiber was wound at a speed of 70 m/min., thereby obtaining a precursor fiber.

The precursor fiber obtained was steam-treated for 15 hours in a thermo-hygrostat kept at relative humidity of 95% (partial pressure of steam=0.54 atmospheric pressure) and temperature of 85° C. The steam-treated fiber was placed in a calcining furnace of air atmosphere, and temperature of the calcining furnace was raised from room temperature to 500° C. at a raising rate of 200° C./hr. Cacining was continued for 1 hour at 500° C., thereby obtaining a catalyst component-containing titania fiber having a fiber diameter of 15 μm. The catalyst component-containing titania fiber obtained was found to have a BET specific surface area of 173 m$^2$/g, the total pore volume of 0.15 cc/g, and a pore volume having a pore diameter of not less than 10 Å of 0.15 cc/g.

Production of Catalyst Sheet 3.13 g of a para type aramid pulp having a unit weight of 50 g/m$^2$, as an aramid fiber, trademark of TWARON, manufactured by Nippon Aramid Co., LTD., 1.88 g of lauryl dimethylaminoacetate betain (effective component content=26%), a trademark of AMPHITOL 24B, manufactured by Kao Corporation, 9.38 g of the catalyst component-containing titania fiber obtained above, and 2.00 g of a defoaming agent, a trademark of FOAMLESS P-98, manufactured by MEISEI CHEMICAL WORKS, Ltd., were added in 1 liter of water in this order, and thereafter, the mixture was mixed under stirring with a pulp disaggregating machine, No. 2529, made by KUMAGAIRIKI Co., Ltd., thereby obtaining a mixture.

To the mixture obtained, 7 liters of water was added, and after mixing the mixture under stirring, a wet paper was obtained using a square form sheet machine, No. 2555, made by KUMAGAIRIKI Co., Ltd. The wet paper obtained was dehydrated and dried to obtain a catalyst sheet having a unit weight of 200 g/m$^2$ and a square size of 250 mm×250 mm.

Example 2

Example 1 was repeated, except that a meta type aramid pulp having a unit weight of 50 g/m$^2$, a trademark of APYEIL, manufactured by Unitika Ltd., was used as the aramid fiber in the same amount as in Example 1, thereby obtaining a catalyst sheet having a unit weight of 200 g/m$^2$ and a square size of 250 mm×250 mm.

Example 3

Production of Catalyst Component-containing Titania Fiber

A solution was prepared by dissolving 600 g of titanium tetra-isopropoxide (first grade reagent), as a titanium alkoxide, manufactured by Wako Pure Chemical Industries, Ltd., 165 g of vanadium isopropoxide manufactured by NICHIA CHEMICAL INDUSTRIES, LTD., and 110 g of ethyl acetoacetate (special grade reagent) manufactured by Wako Pure Chemical Industries, Ltd. in 125 g of isopropyl alcohol (special grade reagent), as a solvent, manufactured by Wako Pure Chemical Industries, Ltd.

The obtained solution was refluxed for 1 hour under nitrogen atmosphere. Here, the amount of vanadium isopropoxide used was controlled to be 27% by weight in terms of vanadium oxide ($V_2O_5$) present in the catalyst component-containing titania fiber obtained hereinafter, provided that the weight of the catalyst component-containing titania fiber was assigned to be 100% by weight; and a molar ratio of the amount of ethyl acetoacetate used to the amount of titanium tetraisopropoxide used was 0.40.

A mixture of 87.2 g of water and 786 g of isopropyl alcohol was added to the above-mentioned solution under stirring, while boiling and refluxing said solution under nitrogen atmosphere, and distilling out isopropyl alcohol. Here, the distilling rate of isopropyl alcohol was controlled so as to be the same as the adding rate of the above-mentioned mixture, and the total adding time of said mixture was controlled to be 117 minutes. A water concentration in the above-mentioned mixture of water and isopropyl alcohol was 10% by weight, and the total amount of water in said mixture was 2.30 times (molar ratio) the amount of titanium tetra-isopropoxide used. Nearly when the amount of said mixture added reached that corresponding to 2.26 moles of water per mole of titanium tetra-isopropoxide, deposition of a polymer began to appear, and when the total amount of said mixture had been added, a complete slurry was obtained.

The slurry was refluxed for 1 hour under nitrogen atmosphere, successively heated to distill out the solvent, and was concentrated up to a Ti concentration of $2.10 \times 10^{-3}$ mole/g. The amount of water distilled out of the system up to the present operation was found to be 0.13 mole per mole of titanium tetra-isopropoxide. Therefore, a difference between the amount of water added and the amount of water distilled out of the system together with the solvent or others was found to be 2.17 moles (=2.30 moles–0.13 mole) per mole of titanium tetra-isopropoxide.

To the concentrated slurry obtained, 711 g of an organic solvent, tetrahydrofuran (special grade reagent) manufactured by Wako Pure Chemical Industries, Ltd., was added, and the obtained mixture was refluxed for 1 hour to dissolve the above-mentioned polymer.

The polymer solution obtained was filtered under nitrogen atmosphere with a TEFLON-made membrane filter having a 3 μm pore diameter, and the filtrate obtained was heated to distill out the solvent mixture of isopropyl alcohol and tetrahydrofuran, thereby obtaining 694 g of a spinning solution having a viscosity of 50 poise (40° C.).

The spinning solution kept at 40° C. was extruded to an air atmosphere of temperature of 40° C. and relative humidity of 60t through a nozzle having an aperture of 50 μm with the aid of a nitrogen gas of 20 Kg/cm² pressure, thereby obtaining a precursor fiber.

The precursor fiber obtained was steam-treated for 18 hours in a thermo-hygrostat kept at relative humidity of 100% (partial pressure of steam=4.70 atmospheric pressure) and temperature of 150° C. The steam-treated fiber was placed in a calcining furnace of air atmosphere, and temperature of the calcining furnace was raised from room temperature to 350° C. at a raising rate of 200° C./hr. Cacining was continued for 1 hour at 350° C., thereby obtaining a catalyst component-containing titania fiber having a fiber diameter of 15 μm. The catalyst component-containing titania fiber obtained was found to have a BET specific surface area of 197 m²/g, the total pore volume of 0.18 cc/g, and a pore volume having a pore diameter of not less than 10 Å of 0.18 cc/g.

Production of Catalyst Sheet 3.13 g of a para type aramid pulp having a unit weight of 50 g/m², a trademark of TWARON, manufactured by Nippon Aramid Co., Ltd., 1.88 g of a surfactant, lauryl dimethylaminoacetate betain (effective component content= 26%), a trademark of AMPHITOL 24B, manufactured by Kao Corporation, 9.38 g of the catalyst component-containing titania fiber obtained above, and 2.00 g of a defoaming agent, a trademark of FOAMLESS P-98, manufactured by MEISEI CHEMICAL WORKS, Ltd., were added in 1 liter of water in this order, and thereafter, the mixture was mixed under stirring with a pulp disaggregating machine, No. 2529, made by KUMAGAIRIKI Co., Ltd., thereby obtaining a mixture.

To the mixture obtained, 7 liters of water was added, and after mixing the mixture under stirring, a wet paper was obtained using a square form sheet machine, No. 2555, made by KUMAGAIRIKI Co., Ltd. The wet paper obtained was dehydrated and dried to obtain a catalyst sheet having a unit weight of 200 g/m² and a square size of 250 mm×250 mm. The nitrogen oxide removal efficiency of the catalyst sheet was found to be 90%.

A shrinkage percent of the catalyst sheet obtained by heat-treatment thereof at 200° C. for 100 hours was found to be 1% or less based on that before the heat-treatment, and a tensile strength and a nitrogen oxide removal efficiency thereof were not different from those before the heat-treatment.

What is claimed is:

1. A heat resistant catalyst sheet comprising an aramid fiber and a catalyst component-containing titania fiber; wherein said aramid fiber and said titania fiber are tangled with each other in said heat resistant catalyst sheet; and a unit weight of the catalyst component-containing titania fiber in the heat resistant catalyst sheet is from about 5 to about 900 g/m².

2. The heat resistant catalyst sheet according to claim 1, wherein the aramid fiber comprises a fibrillated aramid fiber.

3. The heat resistant catalyst sheet according to claim 1, wherein the aramid fiber comprises a para type aramid fiber.

4. The heat resistant catalyst sheet according to claim 2, wherein the aramid fiber comprises a para type aramid fiber.

5. The heat resistant catalyst sheet according to claim 1, wherein the aramid fiber comprises a meta type aramid fiber.

6. The heat resistant catalyst sheet according to claim 2, wherein the aramid fiber comprises a meta type aramid fiber.

7. The heat resistant catalyst sheet according to claim 1, wherein a unit weight of the aramid fiber in the heat resistant catalyst sheet is from about 5 to about 900 g/m².

8. The heat resistant catalyst sheet according to claim 2, wherein a unit weight of the aramid fiber in the heat resistant catalyst sheet is from about 5 to about 900 g/m².

9. The heat resistant catalyst sheet according to claim 3, wherein a unit weight of the aramid fiber in the heat resistant catalyst sheet is from about 5 to about 900 g/m².

10. The heat resistant catalyst sheet according to claim 4, wherein a unit weight of the aramid fiber in the heat resistant catalyst sheet is from about 5 to about 900 g/m².

11. The heat resistant catalyst sheet according to claim 1, wherein a BET specific surface area of the catalyst component-containing titania fiber is from about 20 to about 300 m²/g.

12. The heat resistant catalyst sheet according to claim 1, wherein the catalyst component-containing titania fiber has a pore volume of not less than about 0.05 cc/g, a pore volume having a pore radius of not less than 10 Å of about 0.02 cc/g or more, and a pore radius peak of from about 10 to about 100 Å.

13. The heat resistant catalyst sheet according to claim 1, wherein the catalyst component in the catalyst component-containing titania fiber comprises at least one metal selected from the group consisting of V, W and Mo, or at least one oxide selected from the group consisting of oxides of said metals, or at least one composite oxide selected from the group consisting of composite oxides of said metals.

14. A process for producing a heat resistant catalyst sheet, which comprises mixing an aramid fiber and a catalyst component-containing titania fiber to obtain a mixture thereof; and forming a sheet of the mixture;

wherein said aramid fiber and said titania fiber are tangled with each other in said heat resistant catalyst sheet; and a unit weight of the catalyst component-containing titania fiber in the heat resistant catalyst sheet is from about 5 to about 900 g/m².

15. A process for producing a heat resistant catalyst sheet, which comprises the step of making paper from a mixture of an aramid fiber and a catalyst component-containing titania fiber, wherein the paper-making step is carried out in the presence of at least one surfactant selected from the group consisting of alkyl dimethylaminoacetate betaines represented by the following formula (I), alkylamine acetates represented by the following formula (II) and amines represented by the following formula (III):

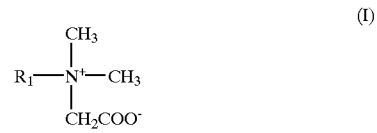

wherein $R_1$ is a $C_8$–$C_{22}$ alkyl group,

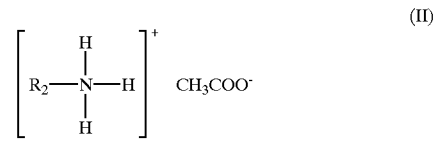

wherein $R_2$ is a $C_8$–$C_{22}$ alkyl group, and

wherein X is a hydrogen atom or a methyl group, Y is a hydrogen atom or a methyl group, and $R_3$ is a $C_8$–$C_{22}$ alkyl group.

* * * * *